United States Patent [19]

Paxos

[11] Patent Number: 5,008,157

[45] Date of Patent: Apr. 16, 1991

[54] METALLIZED ARTICLE AND PROCESS FOR METALLIZING A NON-CONDUCTIVE ARTICLE

[76] Inventor: Michael N. Paxos, 1667 Pinecone, NW., North Canton, Ohio 44720

[21] Appl. No.: 440,252

[22] Filed: Nov. 22, 1989

[51] Int. Cl.[5] ............................................. B32B 15/04
[52] U.S. Cl. .................................. 428/612; 428/621; 428/670; 428/671; 428/674; 428/680
[58] Field of Search ............. 428/612, 621, 670, 671, 428/674, 675, 680

[56] References Cited

U.S. PATENT DOCUMENTS 3,661,538  5/1972  Brown et al. ..................... 428/671

Primary Examiner—Richard O. Dean
Assistant Examiner—George Wyszomierski
Attorney, Agent, or Firm—Renner, Kenner, Greive, Bobak, Taylor & Weber

[57] ABSTRACT

A metallized article (10) having a non-conductive surface (11) and a plurality of depressions (12) in the surface (11). A first layer of metal (13) being mechanically bonded to the non-conductive surface (11), such that the mechanical bond is enhanced by the interaction of the first layer of metal (13) and the depressions (12). An intermediate layer of metal (14) bonded to the first layer (13). A finish layer of metal (15) being bonded to the intermediate layer (14). The finish layer (15) being a metal which readily accepts a high polish or shine. A process for metallizing such an article having a non-conductive surface including the steps of etching the surface of the article with fluoride containing salts and the depositing of a first layer of metal onto the etched surface. The process further including depositing an intermediate layer of metal in an electroless manner, and then depositing a finish layer of metal by electrolysis.

4 Claims, 1 Drawing Sheet

METALLIZED ARTICLE AND PROCESS FOR METALLIZING A NON-CONDUCTIVE ARTICLE

TECHNICAL FIELD

The present invention is generally directed toward metallized, non-conductive articles. More particularly, the present invention is directed toward a non-conductive article having a finish layer of metal electrolytically deposited thereon. Specifically, the present invention is directed toward a ceramic or other non-conductive substrate having a mechanical bond with an intermediate metallic layer and a finish layer of metal electrolytically deposited upon the intermediate layer.

The present invention also contemplates processing steps for metallizing a non-conductive article such as a ceramic, including depositing an intermediate layer of metal upon the non-conductive substrate and then electrolytically depositing a finish layer of metal on the intermediate layer.

BACKGROUND OF THE INVENTION

The present invention is directed toward metallizing the surface area, or portions thereof, of a non-conductive substrate with a suitable and desirable finish layer of metal. For example, it has long been considered desirable to provide ceramic tiles and the like, for use in bathroom or pool area flooring and walls where durability and water imperviousness are primary considerations. Such tiles have long been provided with colorants, or have been painted with metallic paints and "fired" in order to have different colors and designs thereon for aesthetic reasons.

The type of metallic finish articles which have heretofore been known in the art, have had the drawback of not being capable of retaining a high polish or shine. Further, articles that have metallic paint applied often prove to be incapable of withstanding exposure to conditions normally encountered in their intended environment. The metallic finish frequently wears off or dulls in a short time period relative to the normal service life of the tile, leaving no choice but to replace the entirety of the article, usually at great expense.

Conventional electroplating has been a known technology for many years, and is considered useful for providing a durable finish to a conductive article. Because of the requirement that the plated surface be conductive, conventional electroplating processes have not heretofore been useful for metallizing non-conductive substrates.

The metallizing of non-conductive substrates has been limited commercially to only certain materials or to what are essentially experimental laboratory procedures. For instance, processes are known for treating plastics such as acrylonitrile-butadiene-styrene copolymer (ABS). These processes have employed acid etches such as may be accomplished in a chromic sulfuric bath. These processes are not useful for preparing non-conductive substrates such as ceramic, glass or porcelain. The metallizing methods heretofore known in the art for polymeric materials are not capable of metallizing these later types of substrates except by using solutions having a very high acid concentration. These high acid concentrations are known to be very hazardous to both the operators of the involved processes and to the articles themselves.

A need exists, therefore, for a durable, metallized product having a non-conductive substrate of ceramic, glass, porcelain, clay or other such material. Further, a need exists for a process for producing such a metallized article without the danger to operators and the articles that are associated with processes employing solutions having high acid concentrations.

SUMMARY OF THE INVENTION

It is therefore, an object of the present invention to provide a metallized article having a non-conductive substrate of ceramic, glass, porcelain or clay material or the like.

It is another object of the present invention to provide a metallized article wherein the metal finish of the article readily accepts a high polish or shine.

It is a further object of the present invention to provide a metallized article wherein the metal finish is durable and capable of withstanding exposure to harsh conditions such as high steam and dry heat temperatures, abrasion, and water exposure.

It is yet a further object of the present invention to provide a process for metallizing a non-conductive article without the use of solutions having dangerously high concentrations of acid.

It is yet another object of the present invention to provide a process for preparing a non-conductive substrate such that it will accept plating by conventional electroplating techniques.

In general, the present invention relates to a metallized article having an exterior surface. The surface has a plurality of depressions therein, and a first layer of metal is mechanically bonded to the surface, such that the depressions in the surface enhance the mechanical bond. An intermediate layer of metal is bonded to the first layer, and is selected from the group consisting of copper, nickel, gold, silver and cobalt. A finish layer is provided and is bonded to the intermediate layer. The finish layer is a metal selected from the group consisting of gold, platinum, rhodium, palladium, silver, bronze, brass, copper, nickel, iron, chromium, tin, zinc and alloys thereof.

A process for metallizing an article having a non-conductive surface is provided which comprises the steps of etching the surface of the article with a fluoride containing salt solution and preactivating the surface using a cationic wetting agent. The process also includes activating the surface in a solution of palladium chloride, stannous chloride and an acid. The next step includes reducing the palladium chloride to palladium metal by using a suitable reducing agent. An intermediate layer of metal is deposited onto the first layer of metal, and a finish layer of metal is deposited onto the intermediate layer.

These and other objects of the invention, as well as the advantages thereof over existing and prior art forms, which will become apparent in view of the following specification, are accomplished by means hereinafter described and claimed.

PREFERRED EMBODIMENT FOR THE INVENTION

Figure 1:
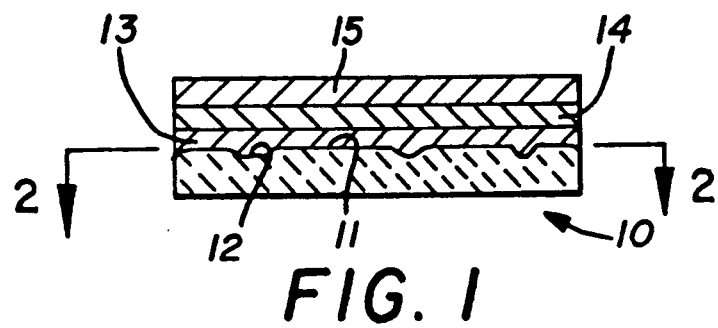
FIG. 1 is a cross-sectional view of an exemplary tile embodying the concept of the present invention and showing particularly the layers affixed to a conventional tile with an unfinished surface.
Figure 2:
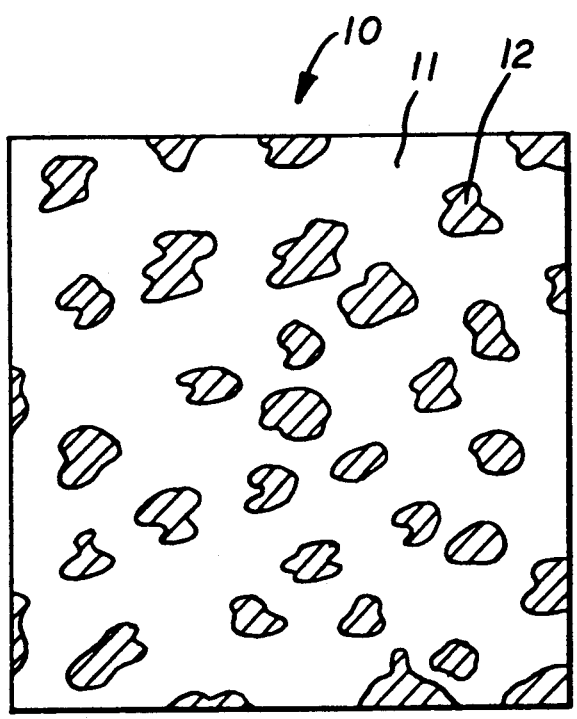
FIG. 2 is a plan view of the upper surface of the tile of FIG. 1, taken substantially along the line 2—2 of FIG. 1.

The present invention has particular applicability to metallizing ceramic, glass, porcelain or other similar articles made of a non-conductive and relatively non-porous material. Many products are fabricated from these materials, and the invention is not limited with respect to any certain type of product. For instance, it may be desirable to produce metallized articles such as bathroom tiles and fixtures, lamps, beverage cups and the like. For the simplicity of the following specification, these products shall be collectively referred to by the term "article," except as indicated otherwise.

Further, the present invention may have applicability to articles made of materials other than ceramic, glass or porcelain without departing from the spirit of the present invention. Metallizing processes heretofore known in the art, such as those known for thermoplastics, have not been found to be useful for metallizing ceramics, glass, porcelain and clay products. Therefore, although the present invention has particular applicability to articles fabricated from these materials, it is not limited to them exclusively, and the term "article" shall only be deemed to refer to a product made from a non-conductive material.

An article fabricated from a non-conductive material embodying the concepts of the present invention, is generally indicated by the numeral 10 in the drawings and has a surface 11 carrying a plurality of pits or depressions 12 formed in surface 11. The article 10 as depicted in the drawings is a floor or wall tile. It is to be appreciated that article 10 may be other types of products such as a fixture, lamp body, beverage container or the like, and is only represented in the drawings as a tile for exemplary purposes in the context of the specification.

Surface 11 acts as a substrate in that a first layer of metal 13 is mechanically bonded thereto. Normally it is very difficult to bond metal to ceramics, glass, porcelain, clay and the like. However, the depressions 12 provide for an improved mechanical bond between article 10 and first layer 13.

The first layer of metal 13 is preferably from about 0.00000025 to about 0.00000100 micrometers thick, and comprises any suitable metal which will mechanically bond with article 10, although palladium is a preferred element.

An intermediate layer of metal 14 may he provided and is readily bonded to first layer 13 such as by electroless deposition. Intermediate layer 14 is made from a metal which will be efficient for use in electrolysis, such metals being well known in the art, but is preferably nickel or copper. Further, intermediate layer 14 may be from about 0.00025 to about 0.000625 micrometers thick.

A finish layer of metal 15 may be provided which is bonded to intermediate layer 14. The finish layer 15 may be of any metal, but is preferably of a metal which will accept a high polish or shine, such as gold, platinum, rhodium, palladium, silver, bronze, brass, copper, nickel, iron, chromium, tin, zinc and alloys thereof. Finish layer 15 may be from about 12.7 to about 50.8 micrometers thick.

An article 10 according to the present invention exhibits high resistance to abrasion, high steam and dry heat temperatures and water. Further, such an article will readily accept a high polish or shine.

The process according to the present invention makes use of fluoride salts to etch surface 11 of the article to be metallized. Fluoride salts have been found to have the advantageous result of sufficiently etching the surface of the article without the hazards accompanying the use of highly concentrated acid solutions. Fluoride salts will etch ceramics, glass, porcelain and clay articles. Heretofore, etching has been accomplished with chromic sulfuric acid solutions, nitric acid solutions and the like. Known processes employing these acids have been for use etching ABS or other plastics where relatively low concentrations of acid prove sufficient. These acid solutions are not useful for etching certain materials such as ceramics and the like, except with the aforementioned, dangerous, high concentrations of acid.

The following is an example of the pre-plating process steps carried out according to the present invention. The term "substrate" refers to the surface of the non-conductive article to be metallized.

The substrate was cleaned by immersing the article in a solution of from about 30 to about 150 grams of an alkaline cleaner, such as sodium hydroxide, in one liter of water at from about 49 to about 60 degrees centigrade. The substrate was then allowed to soak for about one minute in order to remove oils, dust, and the like, and was then rinsed in cold water. While an alkaline cleaner is preferred, it is to be appreciated that other types of cleaners would have equal applicability to cleaning the substrate. For example, alcohols and other organic solvents may have an extent of usefulness in cleaning the substrate.

It is further to be appreciated by one skilled in the art, that the amount of cleaner employed will be varied in order to optimize the cleaning procedures. It is preferred to use from about 45 to about 75 grams of an alkaline cleaner. However, if more time is allowed for the substrate to soak in the cleaner, a lower amount of cleaner may be employed.

The substrate was then etched by immersing the article in a solution of from about 60 to about 120 grams of fluoride containing salts, such as ammonium bifluoride, in one liter of water at from room temperature to about 49 degrees centigrade. The substrate was allowed to soak in the solution at room temperature for from about one to about three minutes.

The etching creates a plurality of depressions or pits in the surface of the substrate. These depressions serve to increase the effectiveness of the mechanical bond between the substrate and the metal layers deposited thereon in subsequent process steps.

As with the cleaning step, one skilled in the art will recognize that the amounts of the etching salt employed, the time allowed for the etching process and the temperature of the etch solution will be varied to optimize the amount of etching obtained. The etching process is allowed to proceed until the surface of the substrate is "wettable" or until water run over the surface of the substrate is trapped in the pits or depressions uniformly over the surface of the substrate. A lower amount of the etch salt may be employed if the substrate is exposed to the etch solution for a longer period of time. The range of the amount of etch salts, the solution temperature and the length of time the substrate is exposed to the etch solution set forth above are preferred.

It is also within the scope of the present invention to provide for depressions or pits in the surface of the article by other than chemical etching techniques. For example, a mechanical roughening of the article surface which would provide for the above described "wettability" of the substrate surface, would accomplish the goals and be within the spirit of the present invention.

Next, after a cold water rinse, the surface of the substrate was neutralized by immersing the article in a liquid neutralizer solution comprising from about three to ten percent by volume of water at from about 21 to about 32 degrees centigrade with an acidity of from about 0.4 to about 0.45 normal for about one to about two minutes. After a further cold water rinse, the substrate was preactivated by immersing the article in a liquid conditioning solution comprising from five to about ten percent by volume of water or a cationic wetting agent at from about 21 to about 32 degrees centigrade for about one to five minutes in order to promote more uniform absorption of the activator to follow. Again, conditions are varied for optimiztion. Examples of cationic wetting agents may be found in McCutcheon, *Detergents and Emulsifiers*, 1979 North American Edition, Glen Rock, N.J. which is hereby fully incorporated by reference with respect to cationic wetting agents.

After the article was again rinsed in cold water, the substrate was activated by immersing the article in a solution containing about five to about fifteen grams of palladium chloride and from about four to about twelve grams of stannous chloride and from about 100 to about 300 grams of hydrochloric acid per liter of water. The temperature of the solution ranged from about 25 to about 45 degrees centigrade and immersion took place for about three to about five minutes, again varying the conditions for optimization. The activation catalyzed the deposition of the palladium metal onto the substrate. Activation of the substrate may be accomplished by activation constituents other than hydrochloric acid. For example, sodium chloride is useful as an activation constituent. Any useful activator is within the scope of the present invention.

Following a rinse in cold water, the deposition of palladium metal onto the substrate was accelerated by immersing the article in a suitable reducing agent from about five to about ten percent by volume. This step was carried out at a temperature of from about 46 to about 55 degrees centigrade and for about one to about three minutes, varying for optimization. As a result, a first layer of metal was formed on the substrate, and a mechanical bond was created between the substrate and the first layer which was enhanced by the "gripping" effect of the first layer of metal to the depressions formed in the etching step.

After another cold water rinse, an intermediate layer of metal was then deposited onto the first layer of metal by immersing the article in a solution containing a metal anion at about room temperature for about 7 to about 15 minutes depending upon the thickness of the intermediate layer desired.

Any metal which will electrolessly deposit onto the first layer of metal is useful for the intermediate layer deposition. Further, the intermediate layer must be itself conductive to electricity. For example, copper, nickel, gold, silver and cobalt are useful for this step. Two exemplary solutions which may be used for copper and nickel, respectively, are listed in Tables I and II hereinbelow.

TABLE I

| Ingredient | Amount[a] |
|---|---|
| copper sulfate | 7.2–8.8 grams/liter |
| formaldehyde | 2.1–3.0 grams/liter |
| EDTA[b] | 0.040–0.050 grams/liter |
| sodium hydroxide | 6.2–6.89 grams/liter |

TABLE II

| Ingredient | Amount[a] |
|---|---|
| nickel sulfate | 8.0–12.0 grams/liter |
| sodium hypophosphite | 8.0–12.0 grams/liter |
| ammonium hydroxide | 0.5% by volume |

[a]parts by weight
[b]ethylenediaminetetraacetic acid

The metal anion solution employed in the electroless deposit of the intermediate layer to the first layer of metal may include complexing agents such as sodium hypophosphite in order to complex the metal ingredients. Further, stabilizing agents such as lead, cyanide, thiourea or bismuth, may be employed which help to maintain the metal ingredients in solution. The invention may be practiced with or without complexing agents and stabilizers.

The article produced by these steps comprises a nonconductive substrate having a first layer of metal, preferably palladium, deposited thereon and bonded thereto by a mechanical bond enhanced by the interaction of the metal with the depressions formed in the surface of the substrate. An intermediate layer of metal, preferably copper or nickel, is deposited in an electroless manner to the first layer.

The article thus prepared may have a finish layer of a metal electrolytically bonded to the intermediate layer. Any metal that may be deposited by electrolysis may be used. A metal which will attain a high polished shine or lustre is preferred, such as gold, platinum, rhodium, palladium, silver, bronze, brass, copper, nickel, iron, chromium, tin, zinc and alloys thereof.

Although any known, conventional technique may be employed to deposit the finish layer of metal to the intermediate layer electrolytically, the present invention includes an electrolysis process which has been found to provide a highly durable finish which readily accepts a high polish or shine.

The article described hereinabove was placed upon a plating fixture carrying an electric current, and was subjected to a cold water rinse. This step was followed by an acid dip and a further cold water rinse. The acid dip is used in order to activate the intermediate layer of metal. While any acid which will accomplish the activation is useful for this step, such as the various mineral acids, a solution of 100–200 grams of concentrated sulfuric acid per liter of water is preferred.

Electrolysis was then begun by immersing the article in a solution comprising from about 165 to about 225 grams per liter of copper sulfate, from about 60 to about 90 grams/liter of sulfuric acid, and from about 40 to about 80 parts per million of chloride in acid copper solution. A low level D.C. current of from about 2 to about 5 amps per square foot was applied to the fixture for from about three to about five minutes and then the D.C. current was raised from about 30 to about 40 amps per square foot.

After a cold water rinse, the article was removed from the fixture and the surface thereof was buffed on a standard open-faced buffing wheel using a buffing compound of silicone and aluminum oxide. This buffing step provided the article with a mirrored surface.

The substrate was then cleaned by immersing the article in from about 45 to about 75 grams per liter of alkaline cleaner. The temperature of the cleaning solution was from about 49 to about 93 degrees centigrade and the substrate was soaked for about one to about three minutes, varying as needed for optimization.

The substrate was again cleaned by being subjected to a conventional electrocleaning procedure. The electrocleaning is useful in removing oxidized materials and left over polish from the substrate. Further, the electrocleaning step again activates the metal surface.

Following a cold water rinse, the article was immersed in an acid dip of about five percent by volume of sulfuric acid at room temperature for about one minute, in order to activate the copper surface. After again rinsing in cold water, a second electroplating operation was then conducted. While second, third or subsequent electroplating steps are not required to practice the present invention, such further electroplating may be accomplished in order to plate the article with desired finishes. If it is desireable to provide the article with a copper finish, then a second plating procedure would not be required. Further, it is not necessary to buff the copper finish, and such buffing is provided only when a mirrored, highly polished surface is desired. Also, it is known that when various metals are plated one on top of the other, different color patterns emerge. The following descriptions of further electroplating are exemplary of these further electroplating techniques. Whether the article is buffed or not, and whether or not layers of metal are electroplated subsequent to the first copper layer, all such articles are within the scope of the present invention.

Further still, copper is preferred for the first layer of electroplated metal because it is relatively inexpensive and because it will accept a mirrored polish. However, any metal which will be deposited by electrolysis is within the scope of the present invention.

The second electroplating solution comprised a metal sulfate, a metal chloride and an acid. For instance, one solution contained 300 grams per liter of nickel sulfate, 60 grams per liter of nickel chloride and 45 grams per liter of boric acid. This solution was found to have a pH of from about 3.8 to about 4.2. Further, the temperature of the solution was from about 54 to 66 degrees centigrade, and the electroplating process was carried out for from about 7 about 15 minutes, varying for optimization.

The second electroplated layer is plated thin enough that the color of the plated metal is apparent to an observer, and yet the mirrored surface of the first copper electroplated layer is allowed to show through. The thickness of the second electroplated layer is such that the article appears to have a mirrored surface.

It is possible to apply a third electroplated layer to the article in a manner similar to that described hereinabove. The second and third layers can comprise any metal capable of being deposited by electrolysis, such as gold, platinum, rhodium, palladium, silver, bronze, brass, copper, nickel, iron, chromium, tin, zinc and alloys thereof.

Following a cold water rinse, the substrate was dried in a hot air oven at 100 degrees centigrade.

The resulting article was found to exhibit high resistance to abrasion and high steam and dry heat temperatures.

As should now be apparent, the present invention teaches a metallized article and a method of metallizing a non-conductive article, accomplishing the objects as set forth above, and otherwise constituting an advantageous improvement in the known art. The examples provided herein are illustrative of certain properties and are not to be construed as limiting practice of the invention. It is to be understood that any variations evident fall within the scope of the claimed invention and that the specific selection of composition constituents can be determined without departing from the spirit of the invention herein described and claimed. Moreover, the scope of the invention shall include all modifications and variations that may fall within the scope of the attached claims.

I claim:

1. A metallized article having an exterior surface comprising:
    a substrate being of a material selected from the group consisting of ceramic, glass, porcelain and clay, said substrate containing a plurality of depressions on its exterior surface;
    a first layer of palladium metal mechanically bonded to the surface of said substrate, said mechanical bond being enhanced by the interaction of said first layer with said depressions;
    an intermediate layer of metal bonded to said first layer, said intermediate layer being a metal selected from the group consisting of copper and nickel; and
    a finish layer of metal bonded to said intermediate layer, said finish layer comprising a metal selected from the group consisting of gold, platinum, rhodium, palladium, silver, bronze, brass, copper, nickel, iron, chromium, tin, zinc, and mixtures thereof.

2. A metallized article as in claim 1, wherein said first layer of metal is from about 0.00000025 to about 0.00000100 micrometers thick.

3. A metallized article as in claim 1, wherein said intermediate layer of metal is from about 0.00025 to about 0.000625 micrometers thick.

4. A metallized article as in claim 1, wherein said finish layer of metal is from about 12.7 to about 50.8 micrometers thick.

* * * * *

UNITED STATES PATENT AND TRADEMARK OFFICE
CERTIFICATE OF CORRECTION

PATENT NO. : 5,008,157

DATED : April 16, 1991

INVENTOR(S) : MICHAEL N. PAXOS

It is certified that error appears in the above-identified patent and that said Letters Patent is hereby corrected as shown below:

On the title page, Item [56], after the reference "3,661,538 5/1972 Brown et al. 428/671", add the references as listed below:

```
--2,690,402    9/28/54     Crehan                  427/290
  3,442,683     /6/69      Lenoble, et al.         427/304
  3,515,649    6/2/70      Hepfer                  204/38
  3,766,134    10/16/73    Dalal                   260/41.5
  3,817,774    6/18/74     Kuzmik                  204/30
  4,036,707     /19/77     Januschkowetz, et al.   204/20
  4,086,128      25/78     Sugio, et al.           156/668
  4,592,808    6/3/86      Doubt                   204/20--
```

Col. 3, line 49, "he" should read --be--.

Col. 7, line 51, "7 about" should read --7 to about--.

Signed and Sealed this

First Day of June, 1993

Attest:

*Attesting Officer*

MICHAEL K. KIRK

*Acting Commissioner of Patents and Trademarks*